United States Patent
Aoki et al.

(10) Patent No.: US 11,767,977 B2
(45) Date of Patent: Sep. 26, 2023

(54) COMBUSTOR AND GAS TURBINE

(71) Applicant: Mitsubishi Power, Ltd., Kanagawa (JP)

(72) Inventors: Kozo Aoki, Tokyo (JP); Toshihiko Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 163 days.

(21) Appl. No.: 17/432,240

(22) PCT Filed: Mar. 16, 2020

(86) PCT No.: PCT/JP2020/011530
§ 371 (c)(1),
(2) Date: Aug. 19, 2021

(87) PCT Pub. No.: WO2020/203232
PCT Pub. Date: Oct. 8, 2020

(65) Prior Publication Data
US 2022/0186929 A1 Jun. 16, 2022

(30) Foreign Application Priority Data
Apr. 5, 2019 (JP) ................................. 2019-072829

(51) Int. Cl.
*F02C 3/30* (2006.01)
*F23R 3/08* (2006.01)
(Continued)

(52) U.S. Cl.
CPC .................. *F23R 3/08* (2013.01); *F02C 3/30* (2013.01); *F02C 7/22* (2013.01); *F23L 7/002* (2013.01);
(Continued)

(58) Field of Classification Search
CPC .... F23R 3/08; F02C 3/30; F02C 3/305; F02C 7/22; F23L 7/002; F23L 2900/07008; F05D 2220/32; F05D 2240/35; F23C 9/08
(Continued)

(56) References Cited

U.S. PATENT DOCUMENTS 4,955,191 A * 9/1990 Okamoto ................ F23R 3/286
60/39.55
5,009,070 A * 4/1991 Iizuka .................... F01D 25/005
60/753
(Continued)

FOREIGN PATENT DOCUMENTS

| CN | 101949540 | 1/2011 |
|---|---|---|
| CN | 103140715 | 6/2013 |

(Continued)

OTHER PUBLICATIONS

International Search Report dated Jun. 2, 2020 in corresponding International Application No. PCT/JP2020/011530, with English translation.
(Continued)

*Primary Examiner* — Steven M Sutherland
(74) *Attorney, Agent, or Firm* — Wenderoth, Lind & Ponack, L.L.P.

(57) ABSTRACT

A combustor includes an outer cylinder, a combustor liner, a plurality of main nozzles, an air flow channel part, and a plurality of water injection parts. The air flow channel part sends air introduced from an outside to between an inner peripheral surface of the outer cylinder and an outer peripheral surface of the combustor liner into the combustor liner. The plurality of water injection parts are provided on the inner peripheral surface of the outer cylinder at intervals in a circumferential direction around a central axis. The plurality of water injection parts inject water into the air flowing through the air flow channel part. The water injection part
(Continued)

includes a first nozzle and a second nozzle. The first nozzle injects water to a first side in the circumferential direction. The second nozzle injects water to a second side in the circumferential direction.

8 Claims, 9 Drawing Sheets

(51) Int. Cl.
  *F02C 7/22* (2006.01)
  *F23L 7/00* (2006.01)
  *F23C 9/08* (2006.01)
(52) U.S. Cl.
  CPC ...... *F05D 2220/32* (2013.01); *F05D 2240/35* (2013.01); *F23C 9/08* (2013.01); *F23L 2900/07008* (2013.01)
(58) Field of Classification Search
  USPC .................................. 60/775, 39.53
  See application file for complete search history.

(56) References Cited

U.S. PATENT DOCUMENTS

| | | |
|---|---|---|
| 5,669,218 A | 9/1997 | Greninger |
| 2007/0199324 A1 | 8/2007 | Tanimura et al. |
| 2009/0077972 A1 | 3/2009 | Singh |
| 2011/0005189 A1 | 1/2011 | Uhm et al. |
| 2014/0096502 A1 | 4/2014 | Karlsson et al. |
| 2016/0265431 A1 | 9/2016 | Tamura et al. |
| 2017/0211805 A1 | 7/2017 | Ramier et al. |
| 2017/0219212 A1 | 8/2017 | Laster et al. |

FOREIGN PATENT DOCUMENTS

| | | |
|---|---|---|
| CN | 105705866 | 6/2016 |
| EP | 3 076 077 | 10/2016 |
| JP | 51-110114 | 9/1976 |
| JP | 2007-232348 | 9/2007 |
| JP | 2014-145563 | 8/2014 |
| JP | 2015-105766 | 6/2015 |
| JP | 2017-525924 | 9/2017 |
| KR | 10-2016-0068851 | 6/2016 |

OTHER PUBLICATIONS

Written Opinion of the International Searching Authority dated Jun. 2, 2020 in corresponding International Application No. PCT/JP2020/011530, with English translation.

* cited by examiner

COMBUSTOR AND GAS TURBINE

TECHNICAL FIELD

The present invention relates to combustor and gas turbines.

Priority is claimed on Japanese Patent Application No. 2019-072829, filed Apr. 5, 2019, the content of which is incorporated herein by reference.

BACKGROUND ART

As combustor used in gas turbines, dual-burning combustor capable of burning gas fuel and oil fuel are known. There is known a technique of injecting water together with the oil fuel into a combustion cylinder in a case where oil fuel is burned by such dual-burning combustor.

For example, Patent Document 1 discloses a combustor including a water supply part in an air flow channel formed between an inner peripheral surface of an outer cylinder and an outer peripheral surface of a combustor liner. The air flow channel formed in the combustor of Patent Document 1 includes a reversing part in which the flow direction is reversed at a rear end of the combustor liner. The air that has passed through the reversing part is supplied to a fuel nozzle that injects fuel into the combustor liner. The water supply part is provided before the reversing part of the air flow channel to supply water or steam to the air flowing through the air flow channel. In the combustor of Patent Document 1, water or steam is supplied to the air with the water supply part to reduce the flame temperature of the combustor and NOx (nitrogen oxide), soot, and the like.

CITATION LIST

Patent Document

Patent Document 1: Japanese Unexamined Patent Application, First Publication No. 2014-145563

SUMMARY OF INVENTION

Technical Problem

In the combustor disclosed in Patent Document 1, water is supplied to the air in the air flow channel between the outer cylinder and the combustor liner. For that reason, the water supplied from the water supply part into the air flow channel tends to adhere to an inner peripheral surface on a radially outer side of the reversing part due to a centrifugal force acting on the water at the reversing part. When water adheres to the inner peripheral surface of the reversing part, it is difficult for the water to reach the flame. As a result, there is room for improvement in the effects of reducing the flame temperature in the combustor and reducing NOx and soot.

The present invention has been made in view of the above circumstances, and an object of the present invention is to provide a combustor and a gas turbine capable of further reducing NOx, soot, and the like.

Solution to Problem

The present invention adopts the following means in order to solve the above problems.

According to the first aspect of the present invention, a combustor includes an outer cylinder, a combustor liner, a plurality of fuel nozzles, an air flow channel part, and a plurality of water injection parts. The outer cylinder has a tubular shape extending in an axial direction. The combustor liner is provided on a radially inner side of the outer cylinder. The combustor liner has a tubular shape extending in the axial direction. The plurality of fuel nozzles are provided inside the combustor liner. The plurality of fuel nozzles are configured to inject fuel. The air flow channel part sends air introduced from an outside to between an inner peripheral surface of the outer cylinder and an outer peripheral surface of the combustor liner into the combustor liner. The plurality of water injection parts are provided on the inner peripheral surface of the outer cylinder at intervals in a circumferential direction around an axis. The plurality of water injection parts inject water toward the radially inner side of the outer cylinder. The water injection part includes a first nozzle and a second nozzle. The first nozzle injects water to a first side in the circumferential direction. The second nozzle injects water to a second side in the circumferential direction.

By adopting such a configuration, the water injection part injects water from the inner peripheral surface of the outer cylinder. The injected liquid droplets are sent into the combustor liner together with the air. Therefore, the liquid droplets are atomized and easily evaporated before reaching a portion where the fuel is injected from the fuel nozzle. Additionally, since water is injected from the inner peripheral surface of the outer cylinder toward the radially inner side of the outer cylinder, even if a centrifugal force acts, the liquid droplets are less likely to be biased radially outward. Therefore, a decrease in the amount of liquid droplets reaching the portion where the fuel is injected from the fuel nozzle is suppressed. Moreover, the first nozzle injects water to the first side in the circumferential direction. The second nozzle injects water to the second side in the circumferential direction. Accordingly, the distribution of the liquid droplets in the air flow channel part becomes non-uniform, and the dispersibility of the liquid droplets is enhanced. Therefore, it is possible to further reduce NOx and soot.

According to a second aspect of the present invention, the water injection part according to the first aspect may include a bracket fixed to the inner peripheral surface of the outer cylinder. The first nozzle and the second nozzle may be provided on the bracket.

By adopting such a configuration, the water injection part can be easily installed only by attaching the bracket provided with the first nozzle and the second nozzle to the inner peripheral surface of the outer cylinder.

According to a third aspect of the present invention, the bracket according to the second aspect may have a first inclined surface and a second inclined surface. The first inclined surface is inclined to the first side in the circumferential direction and is provided with the first nozzle. The second inclined surface is inclined to the second side in the circumferential direction and is provided with the second nozzle.

By adopting such a configuration, the first nozzle provided on the first inclined surface of the bracket injects water to the first side in the circumferential direction. Additionally, the second nozzle provided on the second inclined surface of the bracket injects water to the second side in the circumferential direction. By using such a bracket, the first nozzle and the second nozzle can be easily installed in a state of being inclined in a predetermined direction.

According to a fourth aspect of the present invention, in the combustor according to any one of the first to third aspects, in the water injection parts adjacent to each other in the circumferential direction, the first nozzle of one water injection part and the second nozzle of the other water injection part may be provided at different positions in the axial direction.

By adopting such a configuration, in the water injection parts adjacent to each other in the circumferential direction, the liquid droplets of the water injected from the first nozzle of one water injection part and the liquid droplets of the water injected from the second nozzle of the other water injection part are prevented from interfering with each other. Accordingly, the liquid droplets are prevented from coalescing and increasing in size. Therefore, the liquid droplets are likely to evaporate.

According to a fifth aspect of the present invention, in the combustor according to any one of the first to fourth aspects, in the water injection parts adjacent to each other in the circumferential direction, diameters of nozzle holes for injecting water may be different from each other between the first nozzle and the second nozzle.

By adopting such a configuration, the momentum (flow velocity) of the injected water (liquid droplets) are different between the first nozzle and the second nozzle. Accordingly, distances at which the liquid droplets injected from the first nozzle and the second nozzle, respectively, reach in injection directions are different from each other. Additionally, the grain size of the liquid droplets is also different between the first nozzle and the second nozzle. Accordingly, the distribution of the liquid droplets in the air flow channel part becomes non-uniform, and the dispersibility of the liquid droplets is enhanced.

According to a sixth aspect of the present invention, in the combustor according to any one of the first to fifth aspects, in the water injection parts adjacent to each other in the circumferential direction, the first nozzle and the second nozzle may have water injection directions that are different from each other in the axial direction.

By adopting such a configuration, in the water injection parts adjacent to each other in the circumferential direction, the liquid droplets of the water injected from the first nozzle of one water injection part and the liquid droplets of the water injected from the second nozzle of the other water injection part are prevented from interfering with each other. Accordingly, the liquid droplets are prevented from coalescing and increasing in size. Therefore, the liquid droplets are likely to evaporate.

According to a seventh aspect of the present invention, the combustor according to any one of the first to sixth aspects may include an annular flow channel part and a water supply hole. The annular flow channel part is provided on the outer peripheral surface of the outer cylinder. The annular flow channel part is continuous in the circumferential direction and is supplied with water from the outside. The water supply hole penetrates the outer cylinder in a radial direction. The water supply hole supplies water from the annular flow channel part to each of the plurality of water injection parts.

By adopting such a configuration, water is prevented from being exposed to heat in the outer cylinder of the combustor until the water supplied from the outside reaches the annular flow channel part. Accordingly, piping lines or the like of a system that supplies water are prevented from being affected by thermal stress.

According to an eighth aspect of the present invention, a gas turbine includes the combustor according to any one of the first to seventh aspects.

By doing so, the marketability of the gas turbine can be improved.

Advantageous Effects of Invention

According to the combustor, it is possible to further reduce NOx and soot.

DESCRIPTION OF EMBODIMENTS

Hereinafter, combustor and gas turbines according to embodiments of the present invention will be described with reference to the drawings.

First Embodiment

Figure 1:
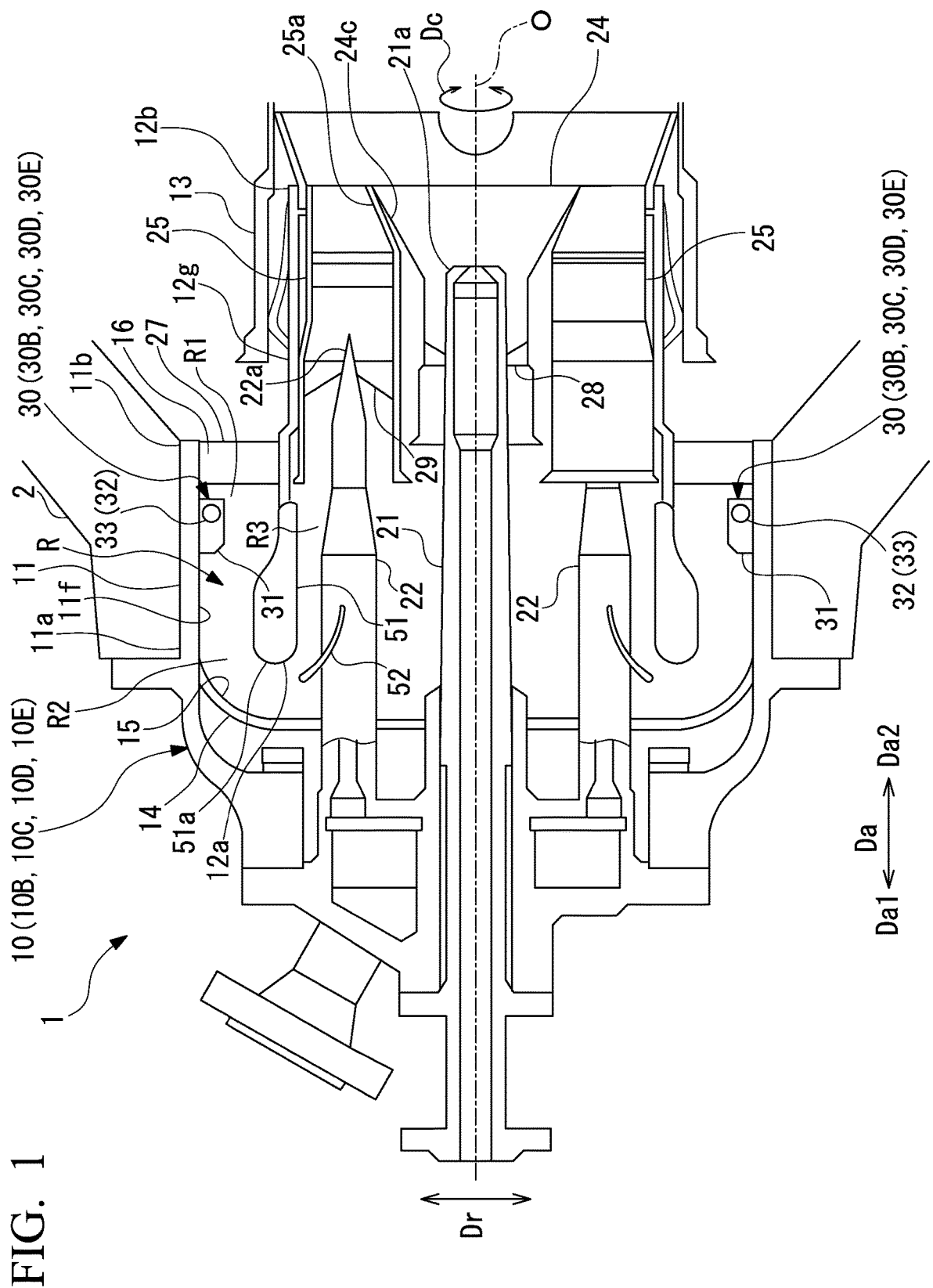
FIG. 1 is a cross-sectional view showing an internal configuration of a combustor according to an embodiment of the present invention.

FIG. 1 is a cross-sectional view showing an internal configuration of a combustor of this embodiment.

As shown in FIG. 1, a combustor 10 of this embodiment is provided in a compartment 2 of a gas turbine 1. The combustor 10 is of a dual type capable of both gas burning and oil burning. Compressed air generated by a compressor of the gas turbine 1 (not shown) is introduced into the combustor 10. The combustor 10 injects fuel into the introduced compressed air to generate high-temperature and high-pressure combustion gas.

The combustor 10 mainly includes an outer cylinder 11, a combustor liner 12, a transition piece 13, a back wall 14, a pilot nozzle 21, a main nozzle (fuel nozzle) 22, an air flow channel part R, and a water injection part 30.

The outer cylinder 11 is supported by the compartment 2 of the gas turbine 1. The outer cylinder 11 is formed in a tubular shape extending in an axial direction Da in which a central axis O extends.

The combustor liner 12 is provided on a radially inner side centered on the central axis O with respect to the outer cylinder 11. The combustor liner 12 has a tubular shape extending in the axial direction Da. An end portion 12a of the combustor liner 12 on a first side Da1 in the axial direction Da is disposed on the radially inner side, centered on the central axis O of an end portion 11a of the outer cylinder 11 on the first side Da1 in the axial direction Da. An end portion 12b of the combustor liner 12 on a second side Da2 in the axial direction Da is disposed closer to a second side Da2 than an end portion 11b of the outer cylinder 11 on the second side Da2 in the axial direction Da. In addition, as the combustor liner 12 in this embodiment, a case where the combustor liner 12 has a cylindrical portion 51 (described below) at the end portion 12a on the first side Da1 in the axial direction Da is an exemplary example.

The transition piece 13 is provided on a radially outer side of the end portion 12b of the combustor liner 12 on the second side Da2. The transition piece 13 has a tubular shape extending in the axial direction Da.

The back wall 14 closes the end portion 11a of the outer cylinder 11 on the first side Da1 in the axial direction Da. The back wall 14 has a guide surface 15 continuous in a circumferential direction Dc around the central axis O. The guide surface 15 is a curved surface that is concave to the first side Da1 in the axial direction Da as viewed from a direction orthogonal to the central axis O. The guide surface 15 is disposed at a distance from the end portion 12a of the combustor liner 12 on the first side Da1.

The pilot nozzle 21 is provided along the central axis O of the combustor liner 12. The pilot nozzle 21 injects the fuel supplied from the outside from a tip portion 21a. A flame is generated by igniting the fuel injected from the pilot nozzle 21.

The pilot nozzle 21 includes a pilot cone 24. The pilot cone 24 is formed in a tubular shape that surrounds the tip portion 21a of the pilot nozzle 21 from an outer peripheral side. The pilot cone 24 has a tapered cone portion 24c. The inner diameter of the tapered cone portion 24c gradually increases in a flame generation direction from the vicinity of the tip portion 21a of the pilot nozzle 21. The tapered cone portion 24c regulates the diffusion range and direction of the flame and enhances the flame retention performance.

A pilot swirler 28 is provided between an outer peripheral surface of the pilot nozzle 21 and an inner peripheral surface of the pilot cone 24. The pilot swirler 28 straightens the air supplied into the pilot cone 24.

A plurality of main nozzles 22 are provided in the combustor liner 12. The plurality of main nozzles 22 are disposed at intervals in the circumferential direction Dc on the radially outer side of the pilot nozzle 21. Each main nozzle 22 extends in the axial direction Da of the combustor liner 12.

A main burner 25 is provided on an outer peripheral side of the tip portion 22a of the main nozzle 22. The main burner 25 has a tubular shape, and a side 25a closer to the pilot cone 24 on the center side of the combustor liner 12 is formed so as to gradually incline toward the outer peripheral side in the flame generation direction.

A main swirler 29 is provided between an outer peripheral surface of the tip portion 22a of the main nozzle 22 and an inner peripheral surface of the main burner 25. The main swirler 29 straightens the air supplied into the main burner 25.

Figure 2:
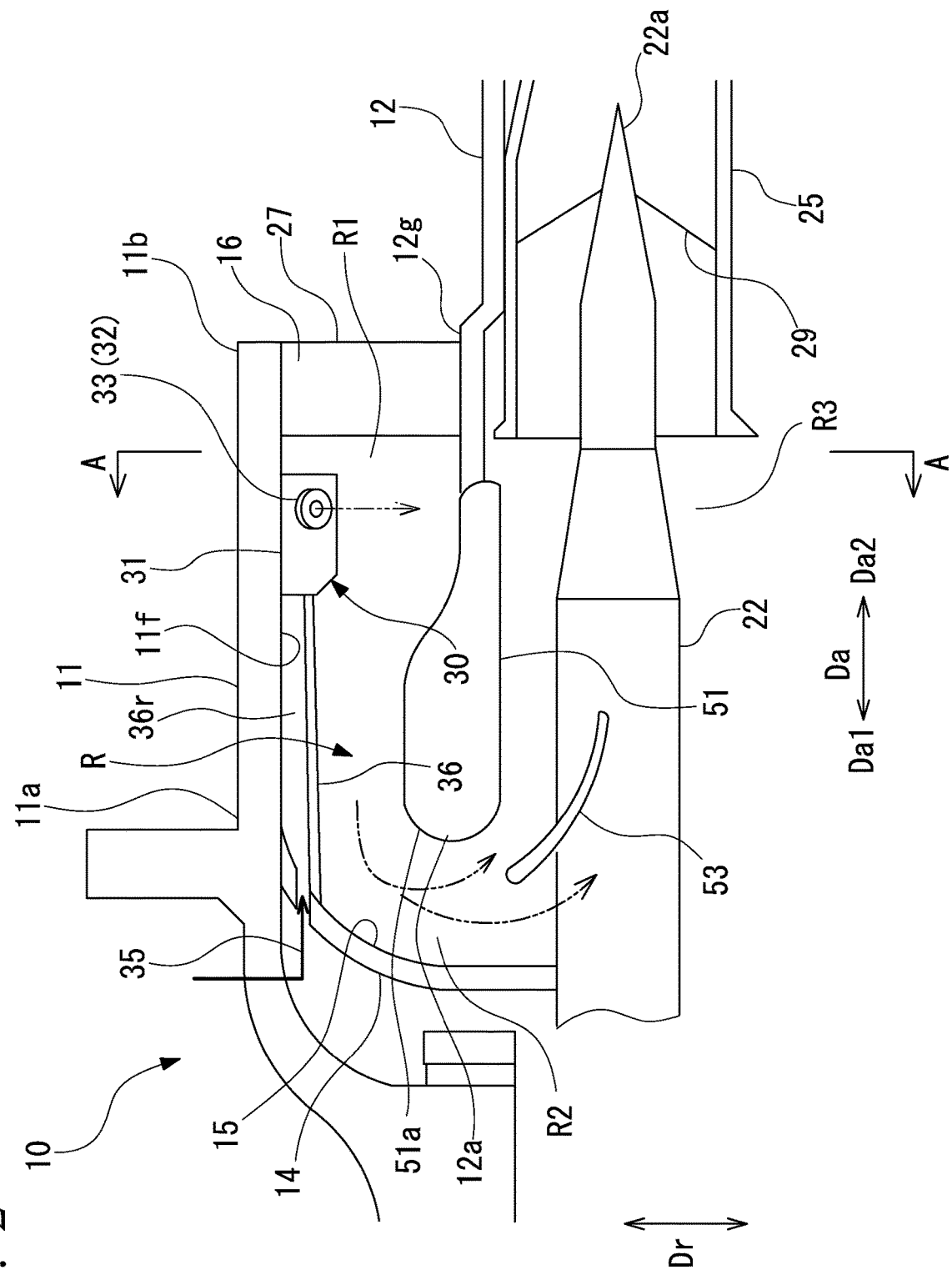
FIG. 2 is an enlarged cross-sectional view showing main parts of the combustor.

FIG. 2 is an enlarged cross-sectional view showing main parts of the combustor.

As shown in FIGS. 1 and 2, the air flow channel part R includes an introduction flow channel portion R1, a reversing flow channel portion R2, and an internal flow channel portion R3.

The introduction flow channel portion R1 is formed between an inner peripheral surface 11f of the outer cylinder 11 and an outer peripheral surface 12g of the combustor liner 12. Air is introduced into the introduction flow channel portion R1 from an opening 16 formed in a gap between the end portion 11b of the outer cylinder 11 on the second side Da2 in the axial direction Da and the outer peripheral surface 12g of the combustor liner 12. A punch metal 27 is provided in the opening 16. The punch metal 27 is a perforated plate in which a large number of holes are formed. The punch metal 27 straightens the air flowing in from the compressor (not shown) of the gas turbine 1. The air introduced into the introduction flow channel portion R1 flows toward the first side Da1 in the axial direction Da in the introduction flow channel portion R1.

The reversing flow channel portion R2 reverses the flow direction of the air introduced into the introduction flow channel portion R1 to the second side Da2 in the axial direction Da. A cylindrical portion 51 and a guide vane 52 are provided in the reversing flow channel portion R2. The cylindrical portion 51 forms the end portion 12a of the combustor liner 12 on the first side Da1 described above. The cylindrical portion 51 has a bell mouth structure that bulges radially outward. The guide vane 52 is provided between the main nozzles 22 adjacent to each other in the circumferential direction Dc. The guide vane 52 extends to be curved radially inward from the vicinity of the tip 51a of the first side Da1 of the cylindrical portion 51 toward the second side Da2 in the axial direction Da.

The reversing flow channel portion R2 reverses the air introduced into the introduction flow channel portion R1 by the guide surface 15 of the back wall 14 and the guide vane 52 so as to flow from the radially inner side to the second side Da2 in the axial direction Da. The air of which the flow direction has been changed by the reversing flow channel portion R2 is sent to the internal flow channel portion R3 in the combustor liner 12.

The internal flow channel portion R3 is formed on the radially inner side of the combustor liner 12. The air of which the flow direction is reversed by the reversing flow channel portion R2 flows through the internal flow channel portion R3 from the end portion 12a of the combustor liner 12 on the first side Da1 in the axial direction Da toward the end portion 12b on the second side Da2 in the axial direction Da.

Figure 3:
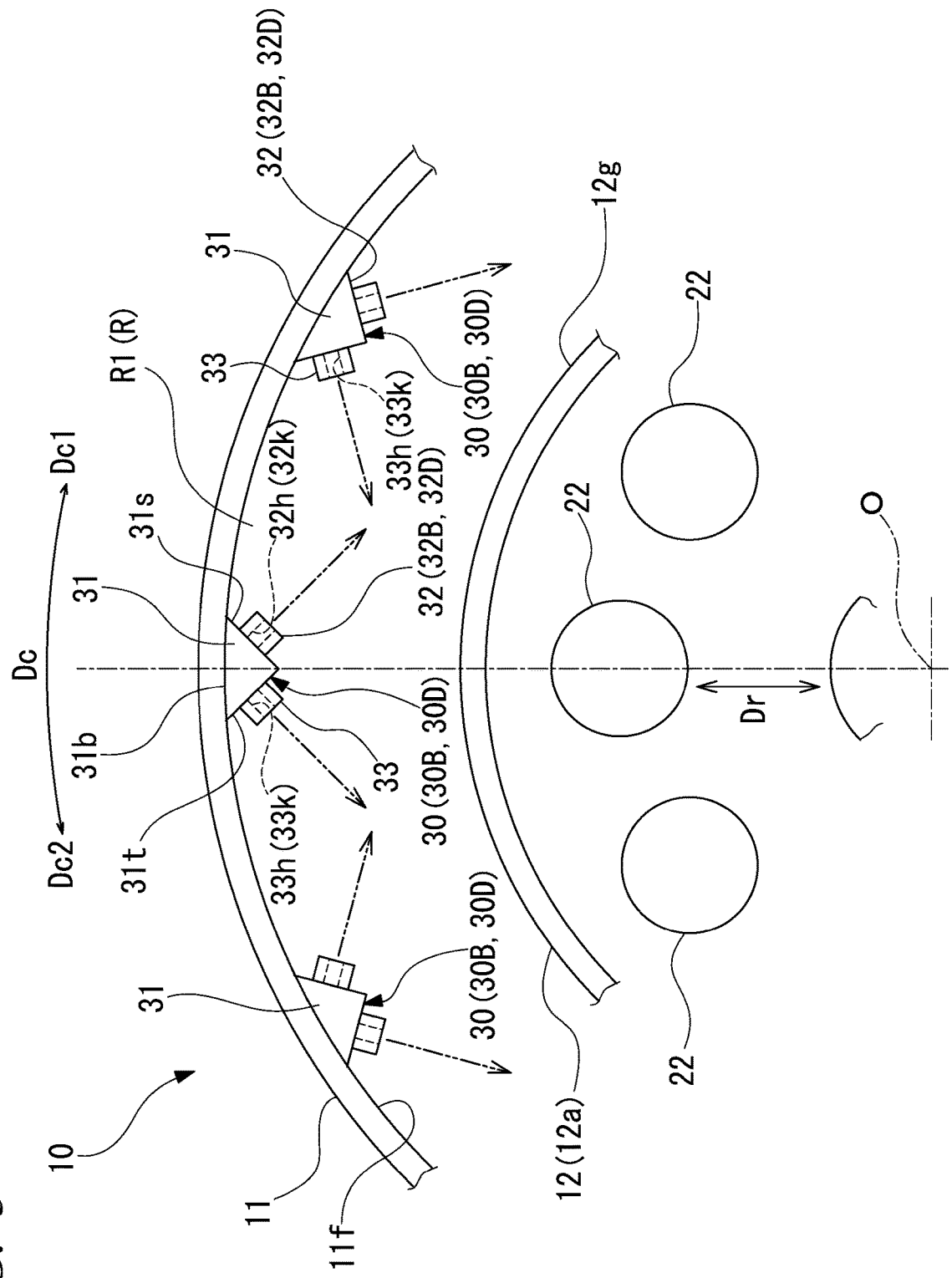
FIG. 3 is a cross-sectional view taken along line A-A of FIG. 2.

FIG. 3 is a cross-sectional view taken along the line A-A of FIG. 2.

As shown in FIGS. 2 and 3, a plurality of the water injection parts 30 are provided at equal intervals in the circumferential direction Dc around the central axis O. Each water injection part 30 is disposed on the radially outer side of the end portion 12a of the combustor liner 12. Each water injection part 30 is disposed on an upstream side of the reversing flow channel portion R2 in the flow direction. The water injection part 30 injects water into the air flowing through the air flow channel part R. The water injection part 30 is provided on the inner peripheral surface 11f of the outer cylinder 11. The water injection part 30 injects water from the inner peripheral surface 11f side of the outer cylinder 11 toward the introduction flow channel portion R1 on the radially inner side inside the combustor 10.

Figure 4:
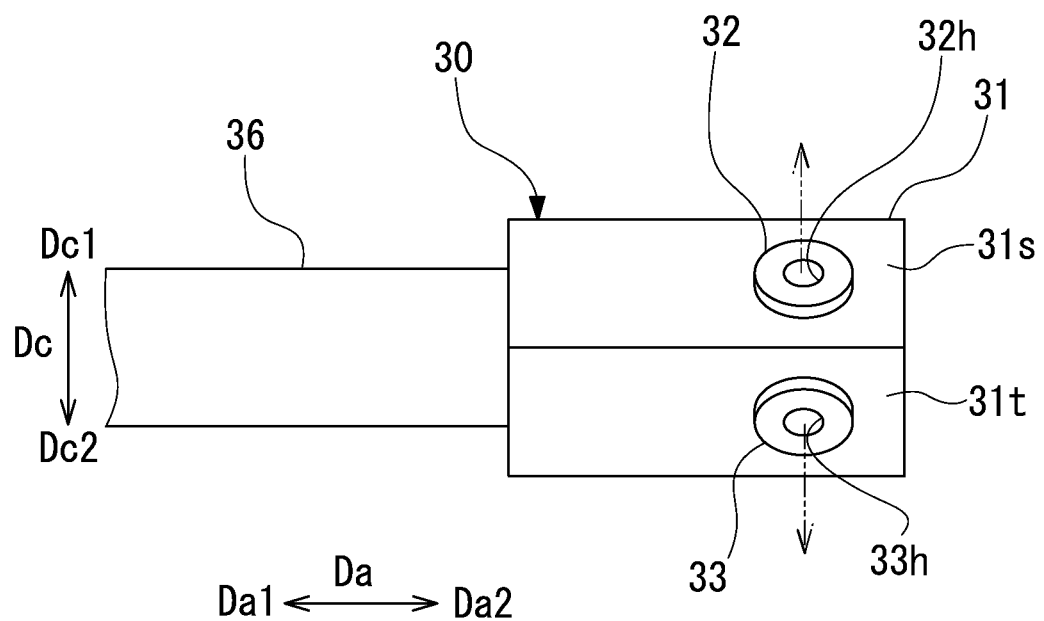
FIG. 4 is a view of a water injection part of the combustor as viewed from a radially inner side of an outer cylinder.

FIG. 4 is a view of a water injection part of the combustor as viewed from the radially inner side of the outer cylinder.

As shown in FIGS. 3 and 4, each water injection part 30 includes a bracket 31, a first nozzle 32, and a second nozzle 33.

The bracket 31 is fixed to the inner peripheral surface 11*f* of the outer cylinder 11. The bracket 31 has a fixed surface 31*b*, a first inclined surface 31*s*, and a second inclined surface 31*t*.

The fixed surface 31*b* abuts against the inner peripheral surface 11*f* of the outer cylinder 11. The bracket 31 is fixed to the inner peripheral surface 11*f* by appropriate fixing means such as welding or bolts in a state where the fixed surface 31*b* abuts against the inner peripheral surface 11*f*.

The first inclined surface 31*s* is inclined to the first side Dc1 in the circumferential direction Dc with respect to the radial direction Dr facing the central axis O of the outer cylinder 11. The second inclined surface 31*t* is inclined to the second side Dc2 in the circumferential direction Dc with respect to the radial direction Dr facing the central axis O of the outer cylinder 11. In other words, the first inclined surface 31*s* and the second inclined surface 31*t* are in contact with each other on the radially innermost side about the central axis O and is inclined so as to be separated from each other toward the radially outer side (in other words, as being closer to the inner peripheral surface 11*f*). Although the first inclined surface 31*s* and the second inclined surface 31*t* in this embodiment are symmetrically formed in the circumferential direction, respectively, and are formed in a planar shape having a constant inclination, the present invention is not limited to this configuration.

The first nozzle 32 is provided on the first inclined surface 31*s*. The first nozzle 32 is formed with a nozzle hole 32*h* for injecting water. The second nozzle 33 is provided on the second inclined surface 31*t*. The second nozzle 33 is formed with a nozzle hole 33*h* for injecting water.

The hole diameter of the nozzle hole 32*h* of the first nozzle 32 provided as an exemplary example in the first embodiment and the hole diameter of the nozzle hole 33*h* of the second nozzle 33 are the same. The range of the effective area of the nozzle holes 32*h* and 33*h* can be, for example, 0.01 mm$^2$ to 2.0 mm$^2$. Moreover, the range of the effective area of the nozzle holes 32*h* and 33*h* may be, for example, 2.0 mm$^2$ to 20.0 mm$^2$. In addition, effective area=Mass flow rate/(2×Differential pressure×Water density)$^{0.5}$ is established.

Water is supplied from an external water supply source (not shown) to such a plurality of water injection parts 30. For that reason, as shown in FIG. 2, a supply flow channel 35 for supplying water to each water injection part 30 is formed on the back wall 14. The water injection part 30 includes a flow channel forming member 36 that connects the supply flow channel 35 and the bracket 31 to each other and supplies water to the bracket 31. The flow channel forming member 36 extends in the axial direction Da and forms a water flow channel 36*r* between the flow channel forming member 36 and the inner peripheral surface 11*f* of the outer cylinder 11. Water is supplied from the supply flow channel 35 through the flow channel 36*r* formed by the flow channel forming member 36 to the bracket 31.

In such a water injection part 30, water is supplied from the external water supply source (not shown) through the supply flow channel 35 and the flow channel 36*r* to the bracket 31. The water supplied to the bracket 31 is distributed to the first nozzle 32 and the second nozzle 33 in the bracket 31. In the first nozzle 32 and the second nozzle 33, the water distributed in the bracket 31 is injected from the nozzle holes 32*h* and 33*h*. As shown in FIG. 4, the first nozzle 32 provided on the first inclined surface 31*s* of the bracket 31 injects water to the first side Dc1 in the circumferential direction Dc. Additionally, the second nozzle 33 provided on the second inclined surface 31*t* of the bracket 31 injects water to the second side Dc2 in the circumferential direction Dc.

In this way, the water injection part 30 injects water from the inner peripheral surface 11*f* of the outer cylinder 11. The liquid droplets injected from the water injection part 30 are injected into the air flowing through the air flow channel part R on the immediate upstream side of the reversing flow channel portion R2. The liquid droplets of the injected water are sent into the combustor liner 12 together with the air. The liquid droplets evaporate due to the heat of a flame generated by the main burner 25.

Therefore, according to the combustor 10 of the first embodiment described above, the water injection part 30 injects water from the inner peripheral surface 11*f* of the outer cylinder 11. Accordingly, liquid droplets are atomized and easily evaporated before reaching a portion where the fuel is injected from the main burner 25. Additionally, water is injected from the inner peripheral surface 11*f* of the outer cylinder 11 toward the inner side of the outer cylinder 11 in the radial direction Dr. Accordingly, even if a centrifugal force acts on the reversing flow channel portion R2, the liquid droplets of water are less likely to be biased to the outer side in the radial direction Dr. For that reason, it is possible to suppress a decrease in the amount of liquid droplets reaching the portion where the fuel is injected from the main nozzle 22. Moreover, the first nozzle 32 injects water to the first side Dc1 in the circumferential direction Dc. The second nozzle 33 injects water to the second side Dc2 in the circumferential direction Dc. Accordingly, the distribution of the liquid droplets in the air flow channel part R becomes non-uniform, and the dispersibility of the liquid droplets is enhanced. As a result, it is possible to reduce the flame temperature in the combustor 10 and further reduce NOx, soot, and the like. Additionally, the liquid droplets evaporate to generate steam, which increases the volume of air containing the steam and improves the output of the gas turbine 1.

The water injection part 30 of the first embodiment includes the bracket 31 fixed to the inner peripheral surface 11*f* of the outer cylinder 11. The first nozzle 32 and the second nozzle 33 are provided on the bracket 31. By adopting such a configuration, the water injection part 30 can be easily installed by simply attaching the bracket 31 provided with the first nozzle 32 and the second nozzle 33 to the inner peripheral surface 11*f* of the outer cylinder 11.

The bracket 31 of the first embodiment has the first inclined surface 31*s* and the second inclined surface 31*t*. Accordingly, the first nozzle 32 provided on the first inclined surface 31*s* of the bracket 31 injects water to the first side Dc1 in the circumferential direction Dc. Additionally, the second nozzle 33 provided on the second inclined surface 31*t* of the bracket 31 injects water to the second side Dc2 in the circumferential direction Dc. By using such a bracket 31, the first nozzle 32 and the second nozzle 33 can be easily installed in a state of being inclined in a predetermined direction.

Second Embodiment

Next, a second embodiment of the combustor according to the present invention will be described. In the second embodiment described below, only the configurations of a first nozzle 32B and a second nozzle 33B are different from those of the first embodiment. Thus, the same portions as those in the first embodiment will be described with the same reference numerals, and duplicate descriptions thereof will be omitted.

Figure 5:
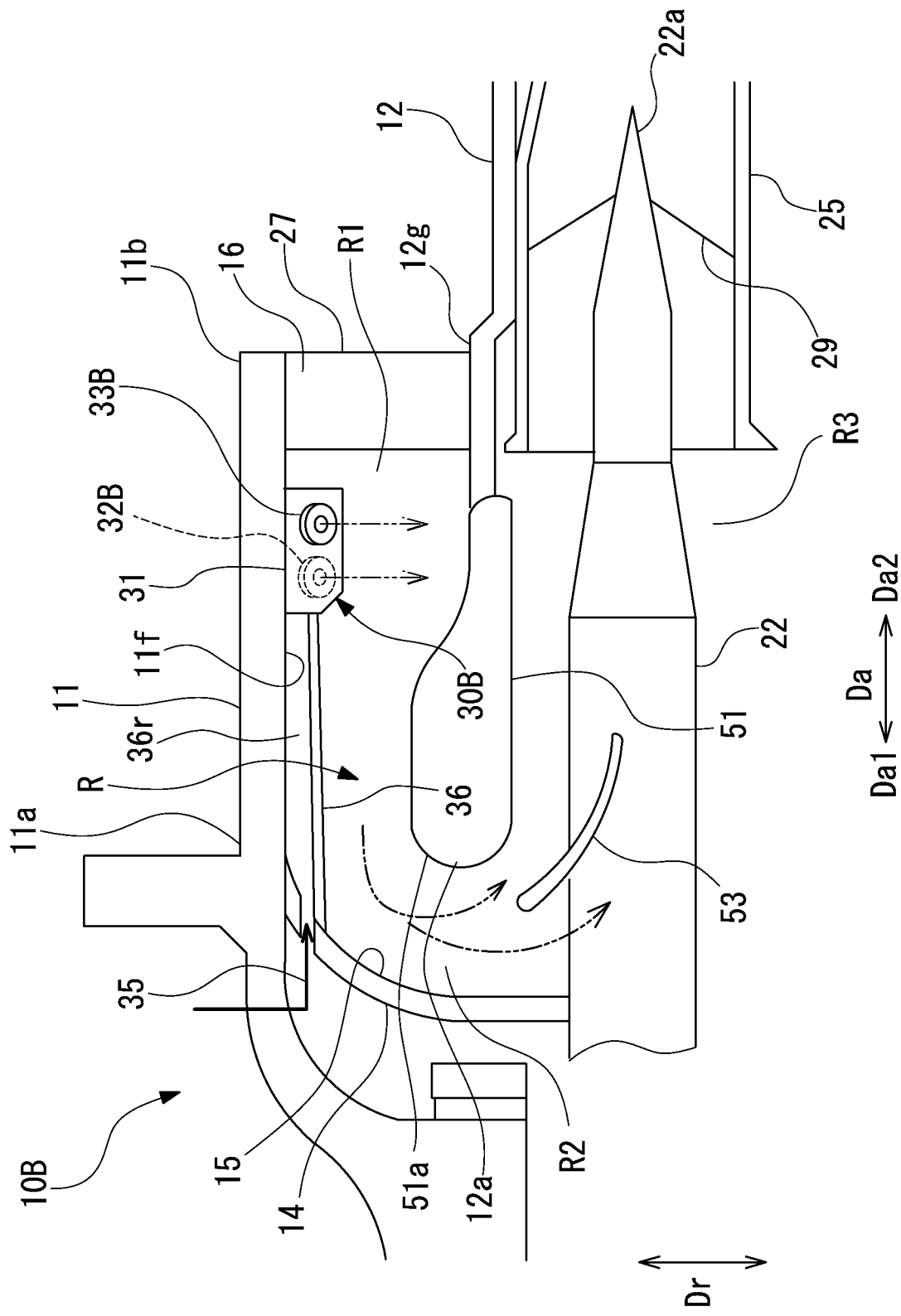
FIG. 5 is an enlarged cross-sectional view showing main parts of a combustor according to a second embodiment of the combustor.
Figure 6:
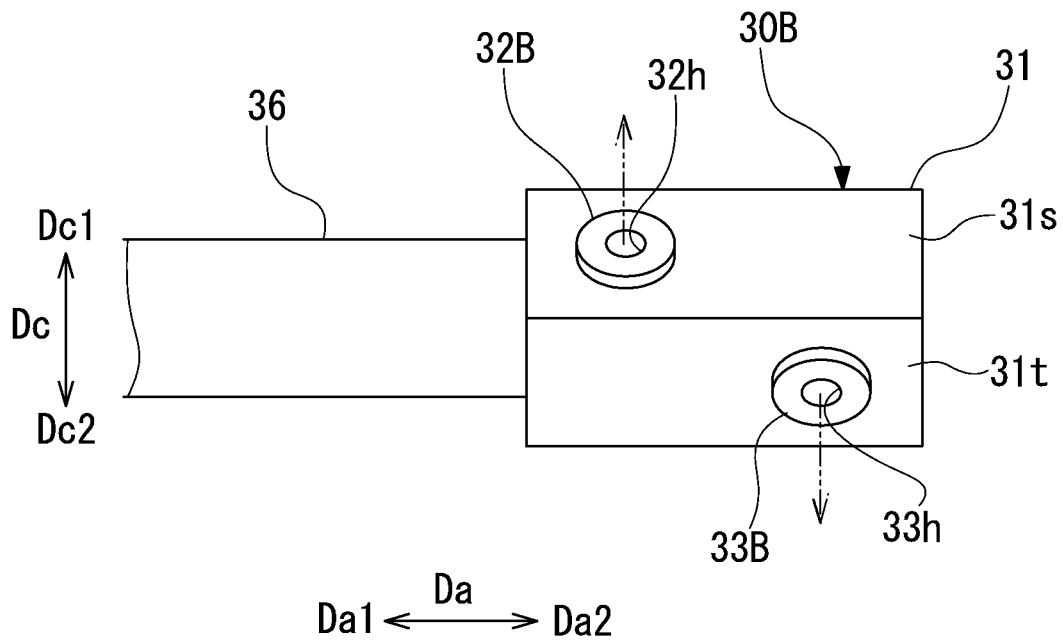
FIG. 6 is a view of a water injection part of the second embodiment of the combustor as viewed from the radially inner side of the outer cylinder.

FIG. 5 is an enlarged cross-sectional view showing main parts of the combustor according to the second embodiment of the combustor. FIG. 6 is a view of a water injection part of the second embodiment of the combustor as viewed from the radially inner side of the outer cylinder.

As shown in FIG. 1, a combustor 10B in this embodiment mainly includes the outer cylinder 11, the combustor liner 12, the transition piece 13, the back wall 14, the pilot nozzle 21, the main nozzle 22, the air flow channel part R, and a water injection part 30B.

As shown in FIGS. 5 and 6, each water injection part 30B includes the bracket 31, a first nozzle 32B, and a second nozzle 33B.

The first nozzle 32B is provided on the first inclined surface 31s. The first nozzle 32B is formed with the nozzle hole 32h for injecting water.

The second nozzle 33B is provided on the second inclined surface 31t. The second nozzle 33B is formed with the nozzle hole 33h for injecting water.

The first nozzle 32B and the second nozzle 33B of the water injection parts 30 (refer to FIG. 3) adjacent to each other in the circumferential direction Dc are provided at different positions in the axial direction Da. In other words, in the water injection parts 30 adjacent to each other in the circumferential direction Dc, the first nozzle 32B of one water injection part 30B and the second nozzle 33B of the other water injection part 30B are provided at different positions in the axial direction Da.

As shown in FIGS. 4 and 5, in the second embodiment, the first nozzle 32B of the one water injection part 30B is provided at a position of the first inclined surface 31s of the bracket 31 on the first side Da1 side in the axial direction Da. Moreover, the second nozzle 33B of the other water injection part 30B is provided at a position of the second inclined surface 31t of the bracket 31 on the second side Da2 side in the axial direction Da. Additionally, in each water injection part 30B, the first nozzle 32B provided on the first inclined surface 31s of the bracket 31 and the second nozzle 33B provided on the second inclined surface 31t are at mutually different positions in the axial direction Da. Accordingly, as shown in FIG. 4, the liquid droplets of the water injected from the first nozzle 32B and the liquid droplets of the water injected from the second nozzle 33B are at different positions in the axial direction Da.

Therefore, according to the combustor 10B of the second embodiment described above, in the water injection parts 30B adjacent to each other in the circumferential direction Dc, the liquid droplets of the water injected from the first nozzle 32B of one water injection part 30B and the liquid droplets of the water injected from the second nozzle 33B of the other water injection part 30B are prevented from interfering with each other. Accordingly, it is possible to prevent the liquid droplets from coalescing into one droplet and increasing in size. As a result, the liquid droplets can be easily evaporated.

In the second embodiment, similar to the first embodiment, it is possible to reduce the flame temperature in the combustor 10B and further reduce NOx, soot, and the like. Additionally, the liquid droplets evaporate to generate steam, which increases the volume of air containing the steam and improves the output of the gas turbine 1.

Third Embodiment

Next, a third embodiment of the combustor according to the present invention will be described. In the third embodiment described below, only the configurations of a first nozzle 32C and a second nozzle 33C are different from those of the first embodiment. Thus, the same portions as those in the first embodiment will be described with the same reference numerals, and duplicate descriptions thereof will be omitted.

Figure 7:
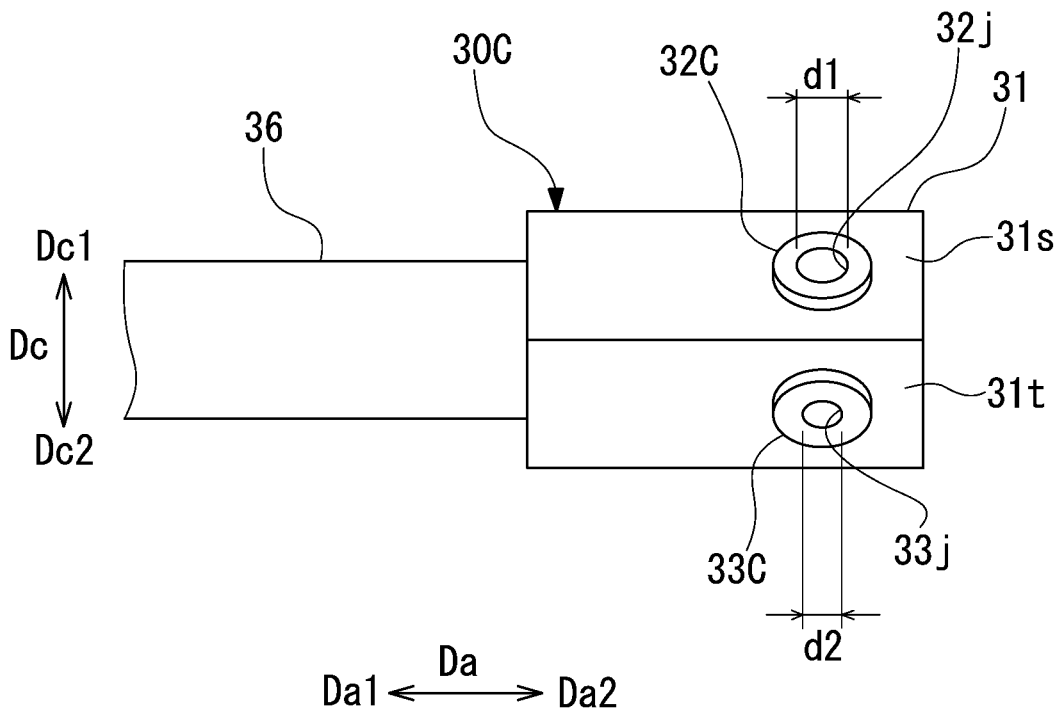
FIG. 7 is a view of a water injection part of a third embodiment of the combustor as viewed from the radially inner side of the outer cylinder.

FIG. 7 is a view of a water injection part of the third embodiment of the combustor as viewed from the radially inner side of the outer cylinder.

As shown in FIG. 1, a combustor 10C in this embodiment mainly includes the outer cylinder 11, the combustor liner 12, the transition piece 13, the back wall 14, the pilot nozzle 21, the main nozzle 22, the air flow channel part R, and a water injection part 30C.

As shown in FIG. 7, each water injection part 30C includes the bracket 31, the first nozzle 32C, and the second nozzle 33C.

The first nozzle 32C is provided on the first inclined surface 31s. The first nozzle 32C is formed with a nozzle hole 32j for injecting water.

The second nozzle 33C is provided on the second inclined surface 31t. The second nozzle 33C is formed with a nozzle hole 33j for injecting water.

In the third embodiment, the diameters of the nozzle holes 32j and 33j for injecting water are different from each other between the first nozzle 32C and the second nozzle 33C adjacent to each other in the circumferential direction Dc. That is, in each water injection part 30C, a diameter d1 of the nozzle hole 32j of the first nozzle 32C provided on the first inclined surface 31s of the bracket 31 and a diameter d2 of the nozzle hole 33j of the second nozzle 33C provided on the second inclined surface 31t of the bracket 31 are different from each other. Accordingly, in the water injection parts 30C adjacent to each other in the circumferential direction Dc, the diameter d1 of the nozzle hole 32j of the first nozzle 32C provided in one water injection part 30C and the diameter d2 of the nozzle hole 33j of the second nozzle 33C provided in the other water injection part 30C are different from each other.

In this embodiment, the range of the effective area of the nozzle hole 32j can be, for example, 0.01 mm$^2$ to 2.0 mm$^2$. Moreover, the range of the effective area of the nozzle hole 32j may be, for example, 2.0 mm$^2$ to 20.0 mm$^2$. In contrast, the range of the effective area of the nozzle hole 33j can be, for example, 0.01 mm$^2$ to 2.0 mm$^2$. Moreover, The range of the effective area of the nozzle hole 33j can be, for example, 2.0 mm$^2$ to 20.0 mm$^2$.

According to the combustor 10C of the third embodiment described above, the diameters d1 and d2 of the nozzle holes 32j and 33j are different from each other between the first nozzle 32C and the second nozzle 33C. Accordingly, the momentum (flow velocity) of water (liquid droplets) to be injected are different between the first nozzle 32C and the second nozzle 33C. For that reason, distances at which the liquid droplets injected from the first nozzle 32C and the second nozzle 33C, respectively, reach in injection directions are different from each other. Additionally, the grain size of the liquid droplets is also different between the first nozzle 32C and the second nozzle 33C. Accordingly, the distribution of the liquid droplets in the air flow channel part R becomes non-uniform, and the dispersibility of the liquid droplets is enhanced. As a result, it is possible to reduce the flame temperature in the combustor 10C and further reduce NOx, soot, and the like. Additionally, the liquid droplets evaporate to generate steam, which increases the volume of air containing the steam and improves the output of the gas turbine 1.

Fourth Embodiment

Next, a fourth embodiment of the combustor according to the present invention will be described. In the fourth embodiment described below, only the configurations of a first nozzle 32D and a second nozzle 33D are different from those of the first embodiment. Thus, the same portions as those in the first embodiment will be described with the same reference numerals, and duplicate descriptions thereof will be omitted.

Figure 8:
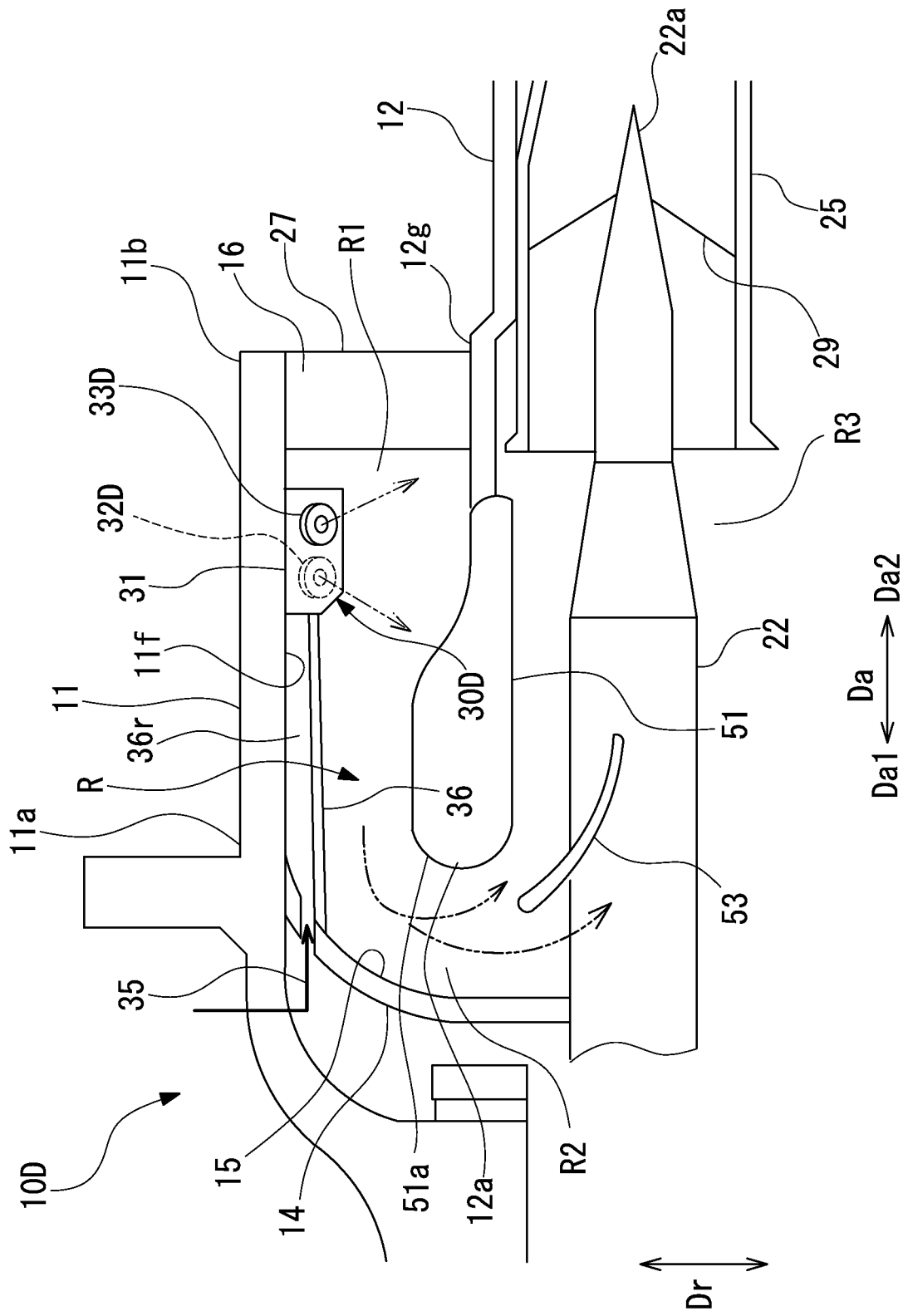
FIG. 8 is an enlarged cross-sectional view showing main parts of a combustor according to a fourth embodiment of the combustor.
Figure 9:
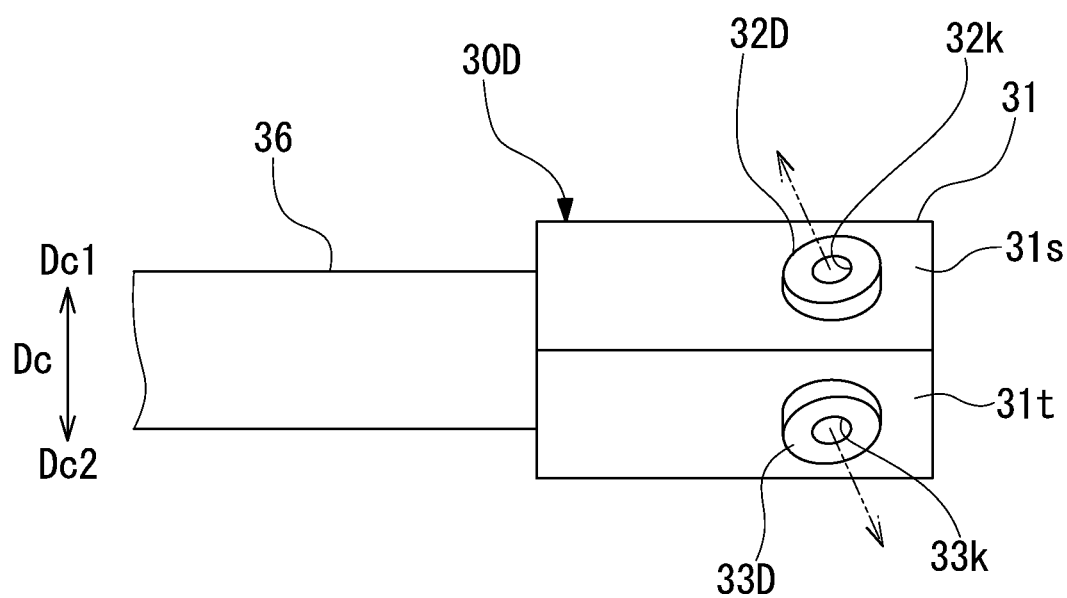
FIG. 9 is a view of a water injection part of the fourth embodiment of the combustor as viewed from the radially inner side of the outer cylinder.

FIG. 8 is an enlarged cross-sectional view showing main parts of the combustor according to the fourth embodiment of the combustor. FIG. 9 is a view of a water injection part of the fourth embodiment of the combustor as viewed from the radially inner side of the outer cylinder.

As shown in FIG. 1, a combustor 10D in this embodiment mainly includes the outer cylinder 11, the combustor liner 12, the transition piece 13, the back wall 14, the pilot nozzle 21, the main nozzle 22, the air flow channel part R, and a water injection part 30D.

As shown in FIGS. 8 and 9, each water injection part 30D includes the bracket 31, the first nozzle 32D, and the second nozzle 33D.

The first nozzle 32D is provided on the first inclined surface 31s. The first nozzle 32D is formed with a nozzle hole 32k for injecting water.

The second nozzle 33D is provided on the second inclined surface 31t. The second nozzle 33D is formed with a nozzle hole 33k for injecting water.

The first nozzle 32D and the second nozzle 33D, which are adjacent to each other in the circumferential direction Dc, have mutually different water injection directions in the axial direction Da. In each water injection part 30D, the first nozzle 32D provided on the first inclined surface 31s of the bracket 31 and the second nozzle 33D provided on the second inclined surface 31t of the bracket 31 have water injection directions from the nozzle holes 32k and 33k that are different from each other in the axial direction Da. In the third embodiment, the nozzle hole 32k of the first nozzle 32D injects water in a direction inclined to the first side Da1 with respect to the direction orthogonal to the axial direction Da. The nozzle hole 33k of the second nozzle 33D injects water in a direction inclined toward the second side Da2 with respect to the direction orthogonal to the axial direction Da. Accordingly, as shown in FIG. 3, in the water injection parts 30D adjacent to each other in the circumferential direction Dc, the first nozzle 32D provided in one water injection part 30D and the second nozzle 33D provided in the other water injection part 30D have water injection directions from the nozzle holes 32k and 33k that are different from each other in the axial direction Da.

Therefore, according to the combustor 10D of the fourth embodiment described above, between the water injection parts 30D adjacent to each other in the circumferential direction Dc, the liquid droplets of the water injected from the first nozzle 32D of one water injection part 30D and the liquid droplets of the water injected from the second nozzle 33D of the other water injection part 30D are prevented from interfering with each other. Accordingly, the liquid droplets are prevented from coalescing and increasing in size. Therefore, the liquid droplets are likely to evaporate. Accordingly, it is possible to reduce the flame temperature in the combustor 10D and further reduce NOx, soot, and the like. Additionally, the liquid droplets evaporate to generate steam, which increases the volume of air containing the steam and improves the output of the gas turbine 1.

In addition, in the fourth embodiment, the first nozzle 32D injects water in the direction inclined toward the first side Da1 in the axial direction Da, and the second nozzle 33D injects water in the direction inclined toward the second side Da2 in the axial direction Da. However, the present invention is not limited to this. Both the first nozzle 32D and the second nozzle 33D may have, for example, mutually different inclination angles while injecting water in the direction inclined to the first side Da1 in the axial direction Da Additionally, both the first nozzle 32D and the second nozzle 33D may have, for example, mutually different inclination angles while injecting water in the direction inclined to the second side Da2 in the axial direction Da.

Moreover, either one of the first nozzle 32D and the second nozzle 33D may inject water in the direction orthogonal to the axial direction Da without being inclined to the first side Da1 or the second side Da2 in the axial direction Da. In this case, the other of the first nozzle 32D and the second nozzle 33D injects water in the direction inclined toward the first side Da1 or the second side Da2 in the axial direction Da.

Fifth Embodiment

Next, a fifth embodiment of the combustor according to the present invention will be described. In the fifth embodiment described below, only the configurations of a first nozzle 32 and a second nozzle 33 are different from those of the first embodiment. Thus, the same portions as those in the first embodiment will be described with the same reference numerals, and duplicate descriptions thereof will be omitted.

Figure 10:
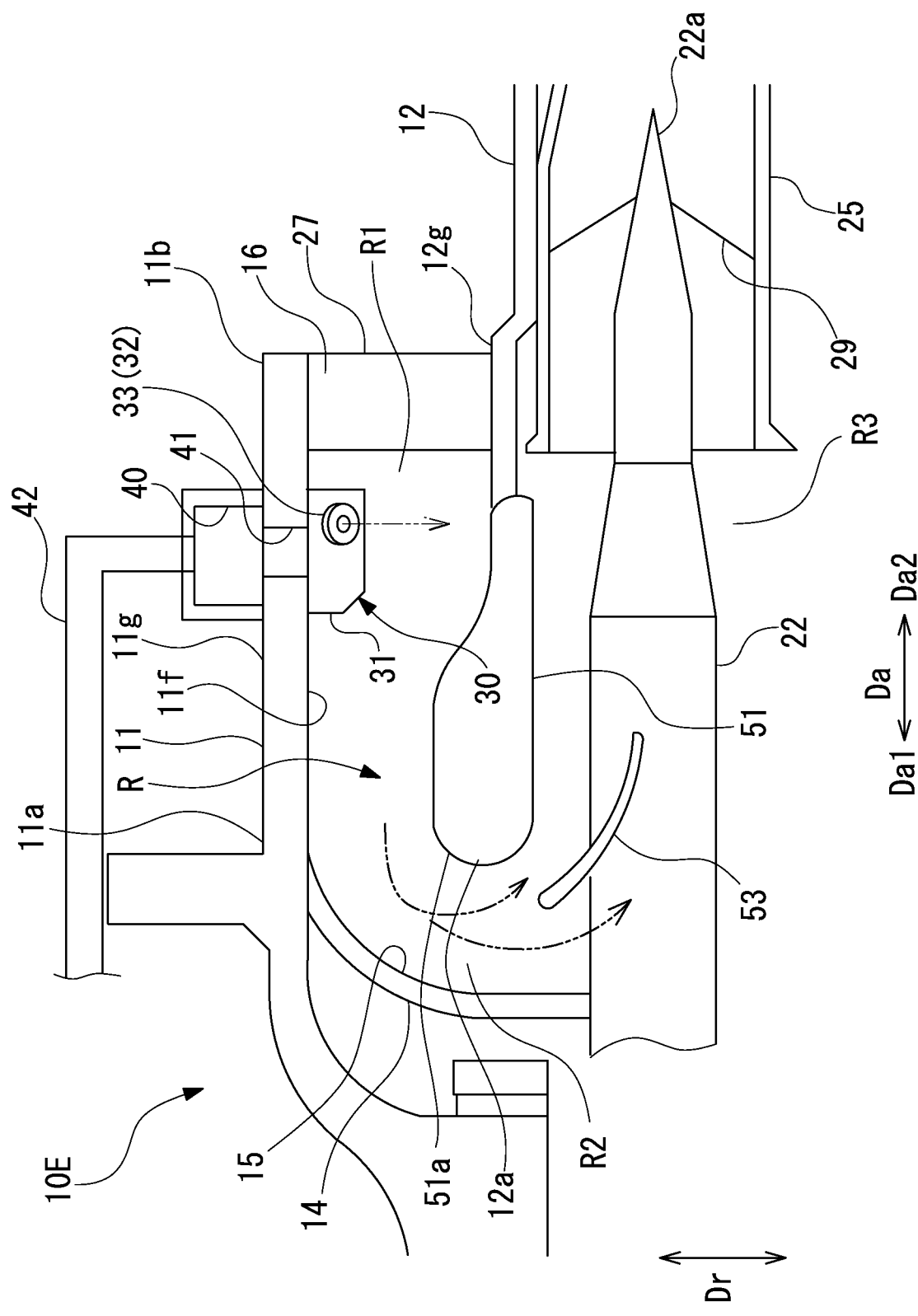
FIG. 10 is an enlarged cross-sectional view showing main parts of a combustor according to a fifth embodiment of the combustor.

FIG. 10 is an enlarged cross-sectional view showing main parts of the combustor according to the fifth embodiment of the combustor.

As shown in FIG. 1, a combustor 10E in this embodiment mainly includes the outer cylinder 11, the combustor liner 12, the transition piece 13, the back wall 14, the pilot nozzle 21, the main nozzle 22, the air flow channel part R, and a water injection part 30E.

A plurality of the water injection parts 30E are provided at equal intervals in the circumferential direction around the central axis O. As shown in FIG. 10, each water injection part 30E includes the bracket 31, the first nozzle 32, and the second nozzle 33.

Water is supplied from the external water supply source (not shown) to the plurality of water injection parts 30E. For this reason, the combustor 10E includes an annular flow channel part 40 and a water supply hole 41.

The annular flow channel part 40 is provided on the outer side of the outer cylinder 11 in the radial direction Dr. The annular flow channel part 40 is provided on an outer peripheral surface 11g of the outer cylinder 11. The annular flow channel part 40 is continuous in the circumferential direction Dc. Water is supplied from the outside via a water supply pipe 42 to the annular flow channel part 40. The water supply pipe 42 is provided through a gap between an inner peripheral surface of the compartment 2 (refer to FIG. 1) of the gas turbine 1 and an outer peripheral surface of the combustor 10E.

The water supply hole 41 penetrates the outer cylinder 11 in the radial direction Dr. The water supply hole 41 is formed on a radially outer side of each of the plurality of water injection parts 30E. The water supply hole 41 supplies water from the annular flow channel part 40 to each of the plurality of water injection parts 30B.

In such a water injection part 30E, water is supplied from the external water supply source (not shown) through the water supply pipe 42, the annular flow channel part 40, and each water supply hole 41 to the bracket 31. The water supplied to the bracket 31 is distributed to the first nozzle 32 and the second nozzle 33. In the first nozzle 32 and the second nozzle 33, the water distributed in the bracket 31 is injected.

Therefore, according to the combustor 10E of the fifth embodiment described above, the water supply pipe 42 and the annular flow channel part 40 are prevented from being exposed to heat inside the outer cylinder 11 of the combustor 10E until the water supplied from the outside reaches the annular flow channel part 40. Accordingly, the water supply pipe 42 and the annular flow channel part 40 are prevented from being affected by thermal stress.

Additionally, similar to the first to fourth embodiments, the first nozzle 32 injects water to the first side Dc1 in the circumferential direction Dc. The second nozzle 33D injects water to the second side Dc2 in the circumferential direction Dc. Accordingly, the distribution of the liquid droplets in the air flow channel part R becomes non-uniform, and the dispersibility of the liquid droplets is enhanced. Therefore, it is possible to further reduce NOx and soot. Additionally, the liquid droplets evaporate to generate steam, which increases the volume of air containing the steam and improves the output of the gas turbine 1.

Other Modification Examples

In addition, the present invention is not limited to the above-described embodiments and includes making various changes to the above-described embodiments without departing from the spirit of the present invention. That is, the specific shape, configuration, and the like given in the embodiments are merely examples and can be appropriately changed. For example, the configurations shown in the first to fifth embodiments can be appropriately combined.

INDUSTRIAL APPLICABILITY

According to the combustor, it is possible to further reduce NOx and soot.

REFERENCE SIGNS LIST

1: Gas turbine
2: Compartment
10, 10B, 10C, 10D, 10E: Combustor
11: Outer cylinder
11a: End portion
11b: End portion
11f: Inner peripheral surface
11g: Outer peripheral surface
12: Combustor liner
12a: End portion
12b: End portion
12g: Outer peripheral surface
13: Transition piece
14: Back wall
15: Guide surface
16: Opening
21: Pilot nozzle
21a: Tip portion
22: Main nozzle (fuel nozzle)
22a: Tip portion
24: Pilot cone
24c: Tapered cone portion
25: Main burner
25a: Side closer to pilot cone
27: Punch metal
28: Pilot swirler
29: Main swirler
30, 30B, 30C, 30D, 30E: Water injection part
31: Bracket
31b: Fixed surface
31s: First inclined surface
31t: Second inclined surface
32, 32B, 32C, 32D: First nozzle
32h, 32j, 32k: Nozzle hole
33, 33B, 33C, 33D: Second nozzle
33h, 33j, 33k: Nozzle hole
35: Supply flow channel
36: Flow channel forming member
36r: Flow channel
40: Annular flow channel part
41: Water supply hole
42: Water supply pipe
51: Cylindrical portion
51a: Tip
52: Guide vane
O: Central axis
R: Air flow channel part
R1 Introduction flow channel portion
R2: Reversing flow channel portion
R3: Internal flow channel portion

The invention claimed is:

1. A combustor comprising:
a tubular outer cylinder extending in an axial direction;
a tubular-shaped combustor liner extending in the axial direction and that is provided on a radially inner side of the tubular outer cylinder;
a plurality of fuel nozzles that are provided inside the tubular-shaped combustor liner and configured to inject fuel;
an air flow channel part that is configured to send air, which is introduced from an outside to between an inner peripheral surface of the tubular outer cylinder and an outer peripheral surface of the tubular-shaped combustor liner, into the tubular-shaped combustor liner; and
a plurality of water injection parts that are provided on the inner peripheral surface of the tubular outer cylinder at intervals in a circumferential direction about an axis and is configured to inject water toward the radially inner side of the tubular outer cylinder,
wherein each of the plurality of water injection parts includes:
a first nozzle that is configured to inject water to a first side in the circumferential direction; and
a second nozzle that is configured to inject water to a second side in the circumferential direction.

2. The combustor according to claim 1,
wherein each of the plurality of water injection parts includes a bracket fixed to the inner peripheral surface of the tubular outer cylinder, and
the first nozzle and the second nozzle are provided on the bracket.

3. The combustor according to claim 2,
wherein the bracket has
a first inclined surface that is inclined to the first side in the circumferential direction and is provided with the first nozzle, and
a second inclined surface that is inclined to the second side in the circumferential direction and is provided with the second nozzle.

4. The combustor according to claim 1,
wherein in water injection parts of the plurality of water injection parts adjacent to each other in the circumferential direction, the first nozzle of one water injection part and the second nozzle of the other water injection part are provided at different positions in the axial direction.

5. The combustor according to claim 1,
wherein in water injection parts of the plurality of water injection parts adjacent to each other in the circumferential direction, diameters of nozzle holes for injecting water are different from each other between the first nozzle and the second nozzle.

6. The combustor according to claim 1,
wherein in water injection parts of the plurality of water injection parts adjacent to each other in the circumferential direction, the first nozzle and the second nozzle have water injection directions that are different from each other in the axial direction.

7. The combustor according to claim 1, further comprising:
- an annular flow channel part that is provided on an outer peripheral surface of the tubular outer cylinder to be continuous in the circumferential direction and to which water is supplied from the outside; and
- a water supply hole that penetrates the tubular outer cylinder in a radial direction and is configured to supply water from the annular flow channel part to each of the plurality of water injection parts.

8. A gas turbine comprising:
the combustor according to claim 1.

* * * * *